US011741377B2

(12) United States Patent
Li et al.

(10) Patent No.: US 11,741,377 B2
(45) Date of Patent: Aug. 29, 2023

(54) TARGET SYSTEM OPTIMIZATION WITH DOMAIN KNOWLEDGE

(71) Applicant: INTERNATIONAL BUSINESS MACHINES CORPORATION, Armonk, NY (US)

(72) Inventors: Guang Cheng Li, Beijing (CN); Rong Yan, Beijing (CN); Yubo Li, Beijing (CN); Qi Ming Teng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1124 days.

(21) Appl. No.: 16/243,318

(22) Filed: Jan. 9, 2019

(65) Prior Publication Data

US 2020/0218990 A1    Jul. 9, 2020

(51) Int. Cl.
 *G06N 5/02*    (2023.01)
(52) U.S. Cl.
 CPC .................................. *G06N 5/02* (2013.01)
(58) Field of Classification Search
 CPC ........................................................ G06N 5/02
 See application file for complete search history.

(56) References Cited

U.S. PATENT DOCUMENTS

| 7,979,247 | B2 | 7/2011 | Butterfield et al. | |
|---|---|---|---|---|
| 2016/0291584 | A1* | 10/2016 | Horn | G05B 13/04 |
| 2017/0262314 | A1* | 9/2017 | Cui | G06F 9/50 |
| 2018/0173206 | A1 | 6/2018 | Pollock et al. | |

OTHER PUBLICATIONS

Ding, Runxiao, et al. "New multiple-target tracking strategy using domain knowledge and optimization." IEEE Transactions on Systems, Man, and Cybernetics: Systems 47.4 (2016): 605-616. (Year: 2016).*

Elkhodary, Ahmed, Naeem Esfahani, and Sam Malek. "FUSION: a framework for engineering self-tuning self-adaptive software systems." Proceedings of the eighteenth ACM SIGSOFT international symposium on Foundations of software engineering. 2010. (Year: 2010).*

Anil, "A Fitness Function Elimination Theory for Blackbox Optimization and Problem Class Learning", University of Central Florida Doctoral Dissertation, Jan. 2012, 175 pages.

* cited by examiner

*Primary Examiner* — Kevin W Figueroa
(74) *Attorney, Agent, or Firm* — Tutunjian & Bitetto, P.C.; Peter Edwards

(57) ABSTRACT

A computer-implemented method, system, and computer program product are provided for optimization with domain knowledge requirements. The method includes receiving, by a processor device, domain knowledge requirements for a target system. The method also includes defining, by a domain knowledge manager, a status of the domain knowledge employing a factor responsive to the domain knowledge. The method additionally includes computing, by an effective metric generator, effective performance metrics responsive to the status of the domain knowledge requirements and real performance metrics. The method further includes generating, by an optimization engine, a target system configuration responsive to the effective performance metrics and the real performance metrics. The method also includes improving the target system by changing a state of a function in the target system responsive to the target system configuration.

20 Claims, 6 Drawing Sheets

TARGET SYSTEM OPTIMIZATION WITH DOMAIN KNOWLEDGE

BACKGROUND

Technical Field

The present invention generally relates to system optimization, and more particularly to target system optimization with domain knowledge.

Description of the Related Art

Performance tuning systems can be challenging for a variety of reasons, tunable parameters optimization can be a major task when performance tuning. Manually tuning optimization parameters can be a difficult and tedious process. Manually tuning optimization parameters require extensive information and knowledge about the system being tuned.

SUMMARY

In accordance with an embodiment of the present invention, a computer-implemented method is provided for optimization with domain knowledge requirements. The method includes receiving, by a processor device, domain knowledge requirements for a target system. The method also includes defining, by a domain knowledge manager, a status of the domain knowledge employing a factor responsive to the domain knowledge. The method additionally includes computing, by an effective metric generator, effective performance metrics responsive to the status of the domain knowledge requirements and real performance metrics. The method further includes generating, by an optimization engine, a target system configuration responsive to the effective performance metrics and the real performance metrics. The method also includes improving the target system by changing a state of a function in the target system responsive to the target system configuration.

In accordance with another embodiment of the present invention, a computer program product is provided for optimization with domain knowledge requirements. The computer program product includes a non-transitory computer readable storage medium having program instructions. The program instructions are executable by a computer to cause the computer to perform a method. The method includes receiving, by a processor device, domain knowledge requirements for a target system. The method also includes defining, by a domain knowledge manager, a status of the domain knowledge employing a factor responsive to the domain knowledge. The method additionally includes computing, by an effective metric generator, effective performance metrics responsive to the status of the domain knowledge requirements and real performance metrics. The method further includes generating, by an optimization engine, a target system configuration responsive to the effective performance metrics and the real performance metrics. The method also includes improving the target system by changing a state of a function in the target system responsive to the target system configuration.

In accordance with yet another embodiment of the present invention, an optimization system utilizing domain knowledge requirements is provided. The optimization system includes a processing system having a processor device and memory receiving domain knowledge requirements. The processing system is programmed parse the domain knowledge requirements. The processing system is also programmed to define, by a domain knowledge manager, a status of the domain knowledge employing a factor responsive to the domain knowledge. The processing system is additionally programmed to compute, by an effective metric generator, effective performance metrics responsive to the status of the domain knowledge requirements and real performance metrics. The processing system is further programmed to generate, by an optimization engine, a target system configuration responsive to the effective performance metrics and the real performance metrics. The processing system is also programmed to improve the target system by changing a state of a function in the target system responsive to the target system configuration.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments in accordance with the present invention provide methods and systems for optimizing a target system utilizing domain knowledge. Further, the methods and systems can view the target system as a black-box with only parameter configurations, performance evaluations, and domain knowledge to generate an optimized configuration for the target system.

Performance engineering teams can have a number of domain knowledge items available when running black-box tunable parameters optimization, for example, e.g., a higher resource utilization after a tunable parameters change can be positive, while a longer queue in the application can be negative, etc. The black-box tunable parameters optimization system does not have to honor the domain knowledge requirements. The black-box tunable parameters optimization system can blindly search for optimizations or can model-fit an optimization to the target system. The black-box tunable parameters optimization system can slow down the convergence and take more time to find the optimal or near optimal configuration. The optimal configuration can improve the target system for throughput, e.g., optimize the target system to be able to handle as many requests as possible in specific interval, for example, 1 second. Queries per second (QPS) and transactions per second (TPS) can be used to describe throughput. The optimal configuration can also improve the target system for latency, e.g., optimize the system to handle the request as quickly as possible, an example is web surfing, smaller latency will make the web pages load faster. The optimal configuration can adjust, e.g., the hardware configuration of the target system, the software configuration of the system, a combination of both hardware and software configurations, etc.

Figure 1:
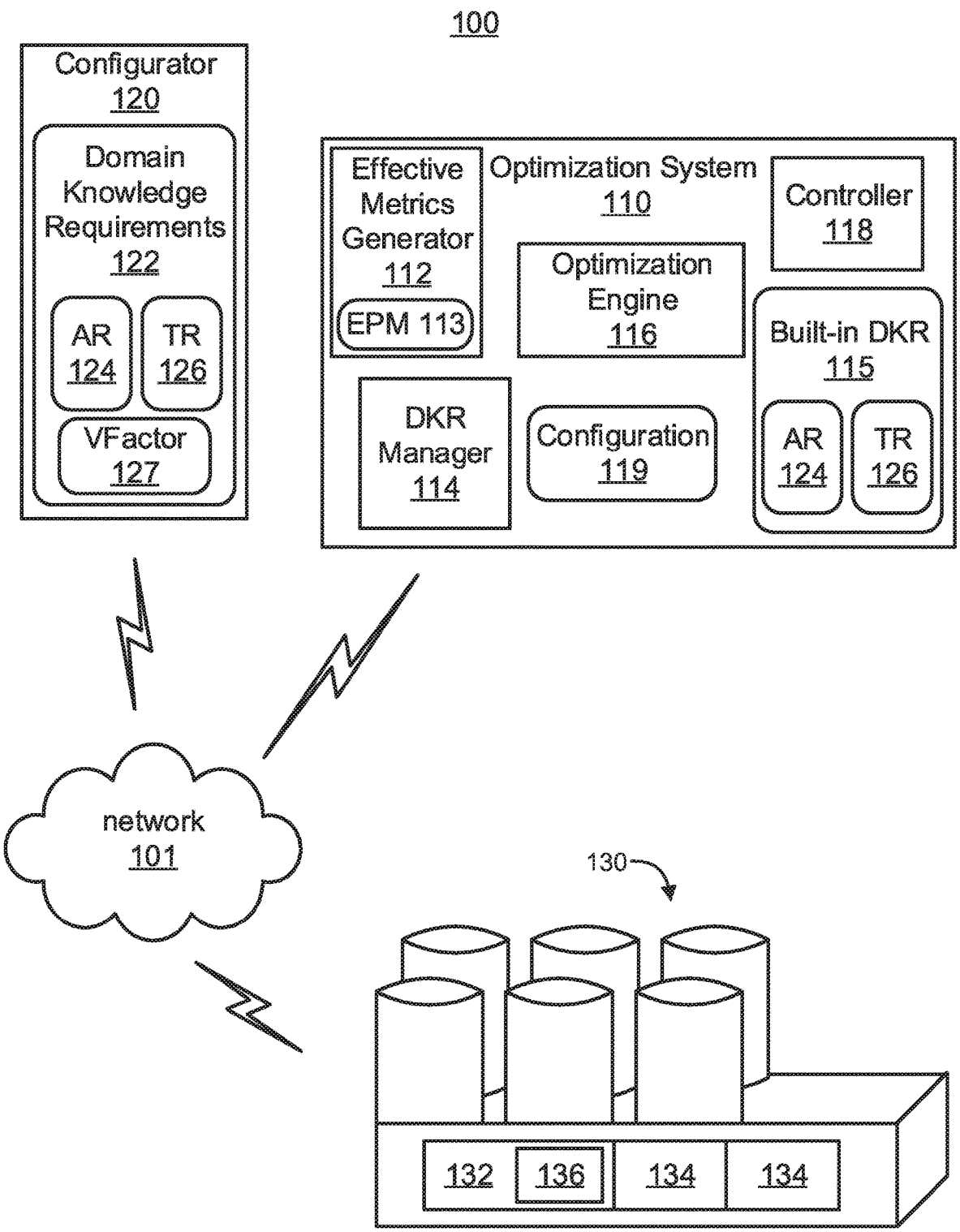
FIG. 1 is an environment with a target system optimized with domain knowledge requirements, in accordance with an embodiment of the present invention.

Referring now to the drawings in which like numerals represent the same or similar elements and initially to FIG. 1, an exemplary environment 100 to which the present invention can be applied is shown, according to an embodiment of the present invention. An optimization system 110 can utilize built-in domain knowledge requirements 115 and domain knowledge requirements 122 from within the optimization system 110 or a configurator 120 to generate a configuration 119 for a target system 130. The configurator 120 can, e.g., connect directly to the optimization system 110, can be integrated into the optimization system 110, can connect to the optimization system 110 over a network 101, etc. The network 101 can be, e.g., a local area network, a wide area network, a cellular network, a wireless network, etc. The network 101 can be utilized to connect the optimization system 110 to the target system 130. In one embodiment, the configurator 120 and the optimization system 110 can be deployed in a cloud computing environment.

The domain knowledge requirements 122 and the built-in domain knowledge requirements 115 can be anything related to the target system 130, for example, e.g., a tunable parameter bigger than a specific number of hits near the central processing unit (CPU) usage boundary, a tunable parameter smaller than specific number triggers for memory swapping, some internal metric could be between about 10 and about 20, or another internal metric that would as high as possible. The domain knowledge requirements 122 and the built-in domain knowledge requirements 115 can be of several types, e.g., assertion type requirements 124, trend type requirements 126, etc. The assertions type requirements 124 should not be violated and can include, e.g., CPU usage should be less than the number of cores, memory usage should be lower than 95%, some internal metric should be between predetermined thresholds, e.g., 10 and 20, networking connections should not exceed a predetermined threshold, e.g., 1024, disk write speed should not exceed a predetermined threshold, e.g., 200 MB/s, processes number should not exceed a predetermined threshold, e.g., 2000, etc. Trend type requirements 126 are a preferred status of the requirement in trend and can include e.g., the higher, the better; the lower, the better; higher CPU usage is positive; higher disk input/output is negative, higher internal application metrics are better; etc.

The optimization system 110 can score a status of the domain knowledge requirements 122 iteratively. In one embodiment, the domain knowledge manager 114 can score the status the domain knowledge requirements 122. The domain knowledge manager 114 can utilize a violation factor 127 to score the domain knowledge requirements 122. In one example, the assertion type requirements 124 can be assigned a status of, e.g. 1, when the domain knowledge requirements 122 is not violated, or the status can be assigned to the violation factor 127 when the domain knowledge requirement 122 is violated, e.g., 0.9. In another example, the trend type requirements 124 can be assigned a score that is a comparison to the current metric of the domain knowledge requirements 122 and a previous iteration metric of the domain knowledge requirements 122. If the current metric is, e.g., 15, and the previous iteration metric is, e.g., 10, the score can be calculated as, e.g., (the current metric divided by the previous iteration metric) multiplied by the violation factor, e.g., (15 divided by 10) multiplied by 1.1 which equals 1.65.

The iterations permit the optimization system 110 to calculate effective performance metrics 113 with the effective metric generator 112. The effective metric generator 112 can receive the real performance metrics 136 from a benchmark system 132 in the target system 130 through the domain knowledge requirement manager 114. The effective metric generator 112 can calculate the effective performance metric 113 in a multitude of manners, including, e.g., responsive to the real performance metrics 136 and the status of the domain knowledge requirement 122 or the built-in domain knowledge requirement 115, multiply the real performance metrics 136 with the violation factor when any of the domain knowledge requirements 122 are violated to avoid further exploitation towards that direction, multiply the real performance metrics 136 with the positive factor if the status of any domain knowledge requirements 122 are improving, multiply the real performance metrics 136 with the negative factor if the status of any domain knowledge requirements 112 are diminishing, etc. In one embodiment, the effective metric generator 112 can define a factor for each of the domain knowledge requirements 122. Based on the status of the domain knowledge requirements 122 in each iteration, the effective metric generates 112 can calculate a domain knowledge requirement score for each of the domain knowledge requirements 122. The effective metric generates 112 can score assertion type requirements 124 as a value, e.g., 1, if not violated and another value, e.g., the factor, if violated. The effective metric generator 112 can score trend type requirements 126 as a percentage of the factor, where the percentage can be change in the domain knowledge requirement 122 towards a preferred direction. For example, utilizing the CPU usage and "higher" preferences, if the CPU usage of the last iteration is 30%, the current iteration is 60%, then the percentage is 60/30=2; but if the CPU usage of current iteration is 15%, then the percentage is 15/30=0.5. The effective metric generator 112 can calculate the effective performance metric 113 as a product of the real performance metric 136 and the domain knowledge requirements 122 scores, e.g., the effective performance metric 113 equals the real performance metric 136 multiplied by a first domain knowledge requirement score multiplied by a second domain knowledge requirement score multiplied by . . . a $n^{th}$ domain knowledge requirement score.

The optimization system 110 can utilize the effective performance metric 113 in an optimization engine 116 to update a controller 118 with the configuration 119. The optimization engine 116 can utilize mathematical or artificial intelligence algorithms to model the correlation between the tunable parameters and performance metrics and predict which of the tunable parameters can get the best performance metrics. In one embodiment, the optimization engine 116 can utilize Bayesian Optimization and Deep Reinforcement Learning.

The effective metric generator 112 can receive domain knowledge requirements 122 from the domain knowledge requirements manager 114. The domain knowledge requirements manager 114 can utilize the built-in domain knowledge requirements 115 and the domain knowledge requirements 122 from the configurator 120. The domain knowledge requirements manager 114 can parse and store the domain knowledge requirements 122 and the built-in domain knowledge requirements 115. In one embodiment, the domain knowledge requirements manager 114 can provide an interface to check the status of the domain knowledge requirements 122 and the built-in domain knowledge requirements 115. In another embodiment, the domain knowledge requirements manager 114 can provide the status of the domain knowledge requirements 122 and the built-in domain knowledge requirements 115 to the effective metrics generator 112.

A controller 118 can send the configuration 119 over the network 101 to the target system 130. Workers 134 in the target system can implement the configuration 119 to optimize the target system 130. In one embodiment, the target system 130 can be optimized to reduce capacity in the worker, e.g., shut off cores in a processor, shut down power generators when the capacity is not needed, etc. In another embodiment, the target system 130 can be optimized to increase capacity in the worker, e.g., enable cores in a processor, bring power generators online when the capacity is needed, etc. In yet another embodiment, the target system 130 can be optimized for throughput, e.g., optimize the target system 130 to be able to handle as many requests as possible in specific interval, for example, 1 second. In an additional embodiment, the target system 130 can be optimized for latency, e.g., optimize the system to handle the request as quickly as possible, an example is web surfing, smaller latency will make the web pages load faster. For example, the target system can be optimized to bypass intermediate memory access during a process to reduce the latency by accessing a high-level cache in a processor.

Figure 2:
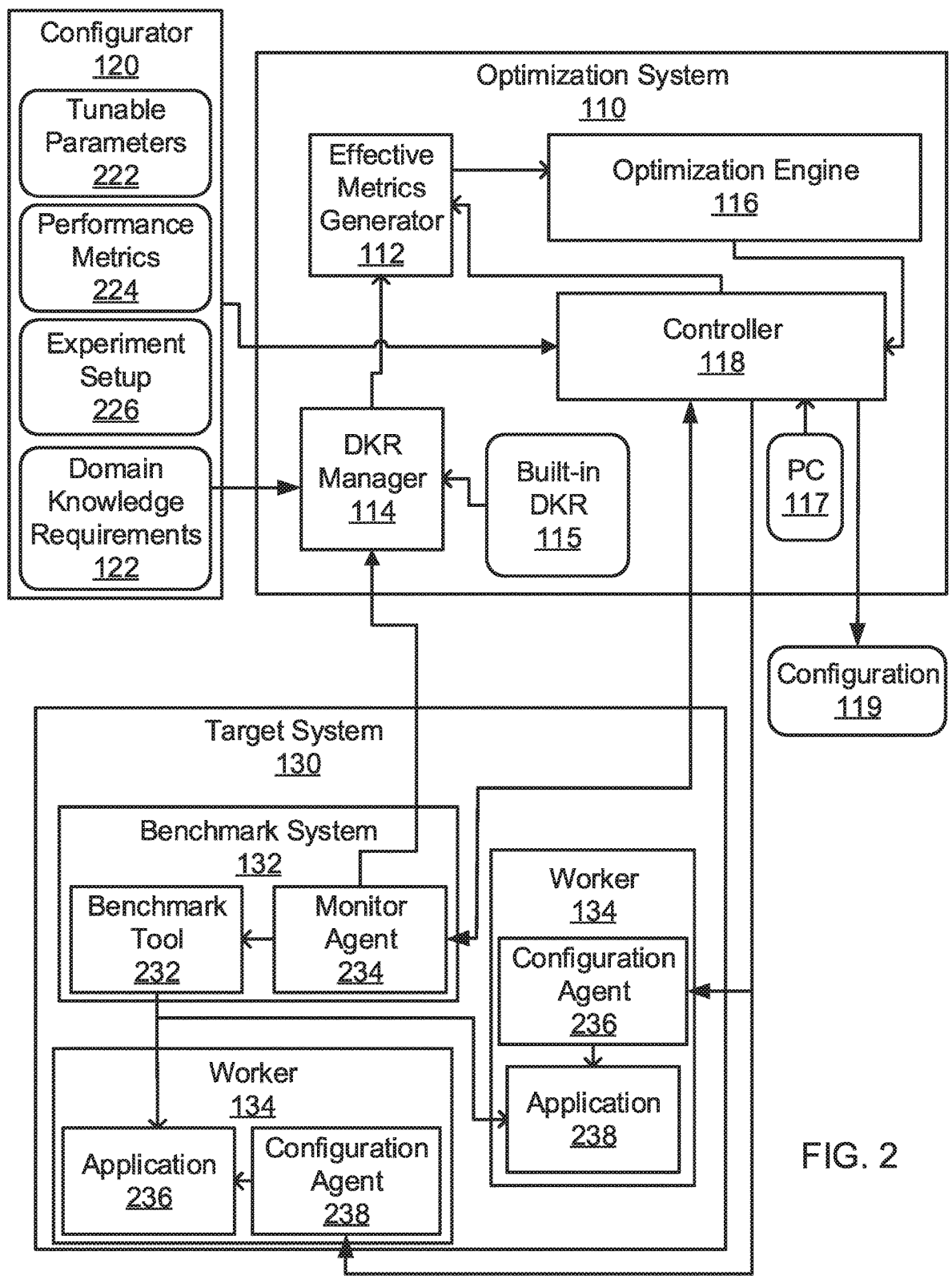
FIG. 2 is a block/flow diagram of the target system optimization with domain knowledge requirements, in accordance with an embodiment of the present invention.

FIG. 2 is a block/flow diagram of the target system 130 optimized with domain knowledge requirements 122, in accordance with an embodiment of the present invention. The optimization system 110 can receive information from the configurator 120. In one embodiment, the configurator 120 is external to the optimization system 110. In another embodiment, the configurator 120 is integrated into the optimization system 110. The information can include, e.g., tunable parameters 222, performance metrics 224, experimental setup 226, and the domain knowledge requirements 122. In one embodiment, the tunable parameters 222 can include, e.g., worker processes, worker connections, keepalive requests, a maximum number of sockets in "TIME_WAIT" state, a maximum number of connection requests queued for any listening socket, a maximum number of remembered connection requests, allow reusing sockets in "TIME_WAIT" state for new connections, a maximum wait time to keep sockets in the "FIN-WAIT-2" state when closing the socket, cause packets to bypass the prequeue queue and go directly to the receive queue, etc. In another embodiment, the performance metrics 224 can include, e.g., success rate, etc. In yet another embodiment, the experimental setup 226 can include, e.g., Kubernetes systems. In one embodiment, the configurator 120 sends the information to the controller 118. In another embodiment, the configurator 120 send the information to the domain knowledge requirement manager 114 and the controller 118. The domain knowledge requirement manager 114 can parse and sort the domain knowledge requirements 122. The optimization system 110 can include built-in domain knowledge requirements 115 can be utilized by the domain knowledge requirements manager 114.

The controller 118 can read and parse the information from the configurator 120. The controller can utilize the information to command the effective metric generator 112 to feed the effective performance metrics 113 to the optimization engine 116. The optimization engine 116 can employ the effective performance metrics 113 to suggest to the controller 118 which tunable parameters 222 to adjust. The controller 118 can communicate the tunable parameters 222 to the target system 130. The tunable parameters 222 in the targets system 120 go to configuration agents 236 in the workers 134. In one embodiment, the controller 118 communicates with the configuration agents directly. In another embodiment, the controller 118 communicates with the configuration agents 236 thought a communication interface in the target system 130.

The target system 130 can employ a benchmark system 132 to monitor the workers 134. The workers 134 can implement the tunable parameters 222 in applications 238. The applications 238 can be monitored by the benchmark system 132. In one embodiment, the benchmark system 132 can utilize a benchmark tool 232 to monitor the applications 238. The benchmark tool 232 can be controlled by a monitor agent 234. The monitor agent 234 can compile real performance metrics 136 from the workers and send the real performance metrics to the optimization system 110. In one embodiment, the monitor agent sends the real performance metrics 136 to the controller 118. In another embodiment, the monitor agent 234 sends the real performance metrics 136 to the domain knowledge requirements manager 114. In yet another embodiment, the monitor agent 234 can send status of the domain knowledge requirements 122.

The domain knowledge requirements manager 114 can send the real performance metrics 136 with the status of the domain knowledge requirements 122 to the effective metric generator 112. The effective metrics generator 112 can utilize the real performance metrics 136 with the status of the domain knowledge requirements 122 to generate the effective performance metrics 113. The optimization system 110 and the target system 130 can iteratively repeat sending tunable parameters 222 from the optimization system 110 to the target system 130 and the target system 130 returning real performance metrics 136 until a predefined condition (or conditions) 117 is/are met. In one embodiment, the predefined condition 117 can include, e.g., how many iterations to run, how much time to complete the auto tuning, etc. Once the predefined condition 117 is met, the controller 118 can generate the configuration 119. The optimization system 110 can send the configuration 119 to the target system 130 to optimize the workers 134 in the target system 130.

Figure 3:
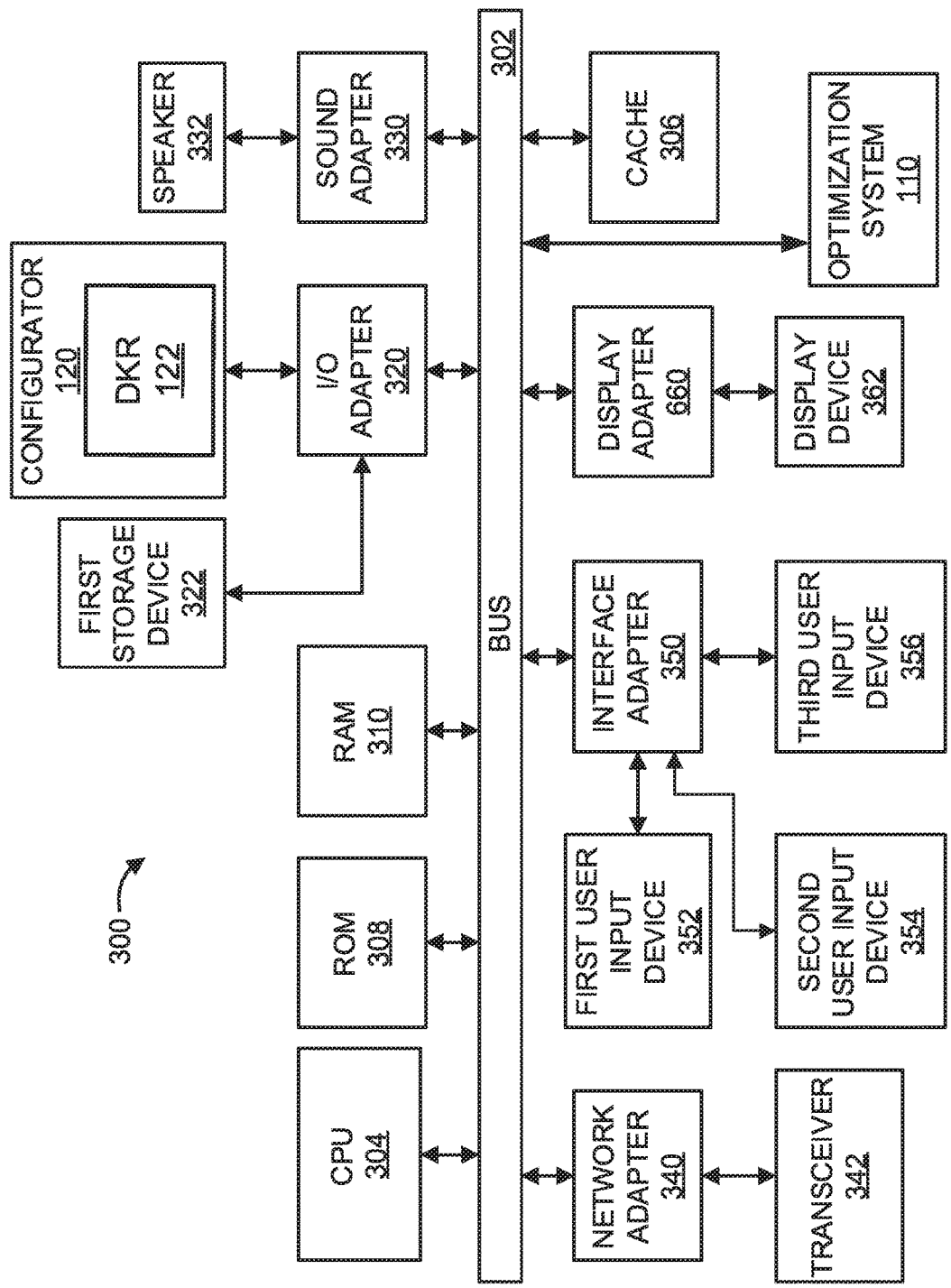
FIG. 3 is a block/flow diagram of an exemplary processing system with an optimization system and configurator, in accordance with embodiments of the present invention.

FIG. 3 is an exemplary processing system 300 with the optimization system 110 and the configurator 120, in accordance with an embodiment of the present invention. The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, the optimization system 110, a user interface adapter 350, and a display adapter 360, are operatively coupled to the system bus 302.

A first storage device 322 is operatively coupled to system bus 302 by the I/O adapter 320. The storage device 322 can be any of a disk storage device (e.g., a magnetic or optical disk storage device), a solid state magnetic device, and so forth. The enhanced search strategy 150 can be coupled to the system bus 302 by the I/O adapter 320. The configurator 120 can send information to the processing system 300 for optimization. The configurator 122 can include domain knowledge requirements 120. The optimization system 110 can utilize the domain knowledge requirements 122 to generate a configuration for the processing system 300 to improve the performance of the processing system 300, e.g., by reducing CPU 304 usage, increasing memory performance, etc.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present invention provided herein.

Moreover, it is to be appreciated that environment 100 described above with respect to FIG. 1 is an environment for implementing respective embodiments of the present invention. Part or all of processing system 300 may be implemented in one or more of the elements of environment 100.

Figure 6:
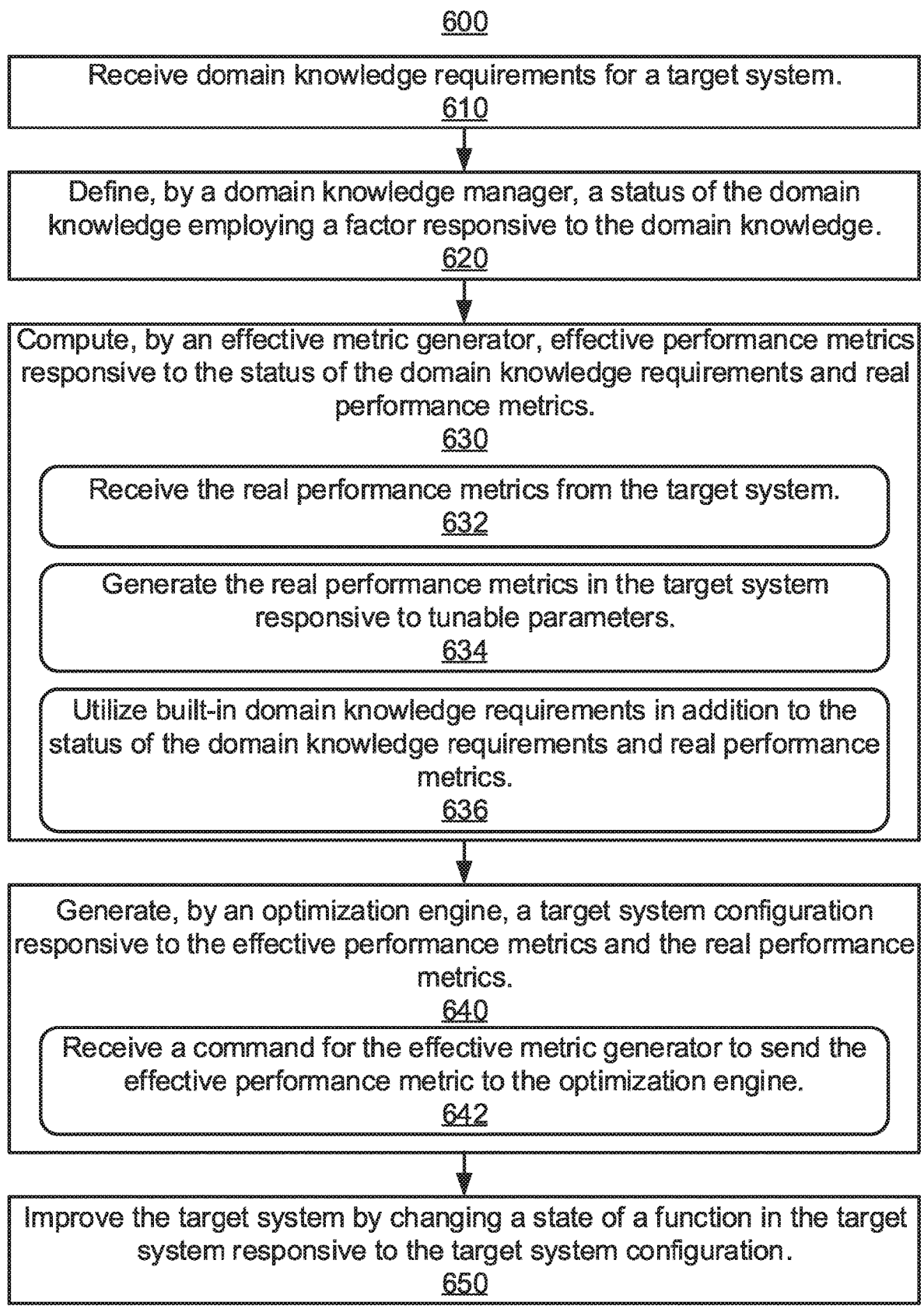
FIG. 6 is a block/flow diagram showing the optimization method with domain knowledge requirements, in accordance with an embodiment of the present invention.

Further, it is to be appreciated that processing system 300 may perform at least part of the method described herein including, for example, at least part of the optimization method 600 with domain knowledge requirements of FIG. 6.

Figure 4:
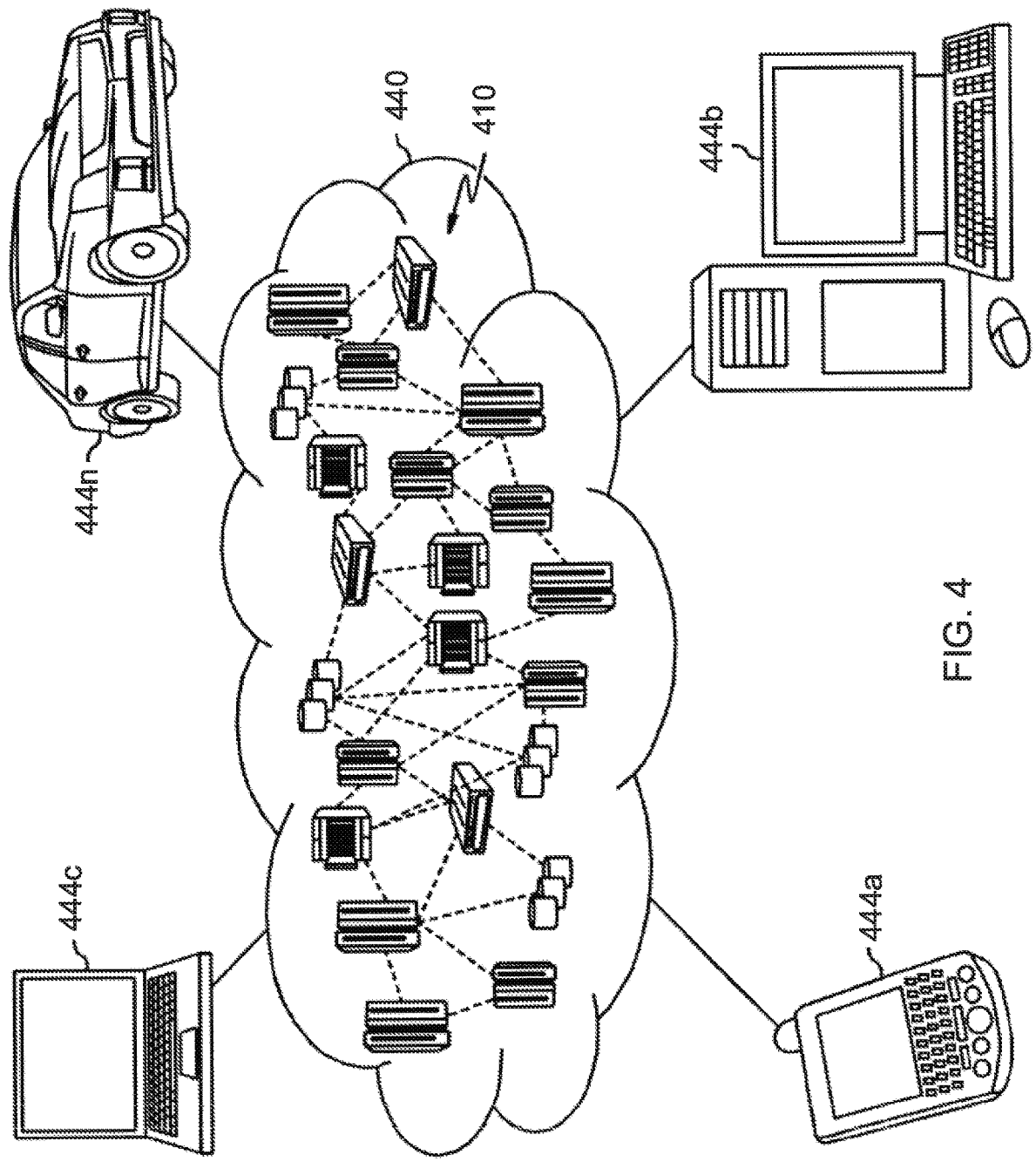
FIG. 4 is a block/flow diagram of an exemplary cloud computing environment, in accordance with an embodiment of the present invention.

FIG. 4 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 440 is depicted for enabling use cases of the present invention. As shown, cloud computing environment 440 includes one or more cloud computing nodes 410 with which local computing devices used by cloud consumers, such as, for example, personal digital assistant (PDA) or cellular telephone 444A, desktop computer 444B, laptop computer 444C, and/or automobile computer system 444N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 440 to offer infrastructure, platforms and/or software as services for which a cloud consumer does not need to maintain resources on a local computing device. It is understood that the types of computing devices 444A-N shown in FIG. 4 are intended to be illustrative only and that computing nodes 410 and cloud computing environment 440 can communicate with any type of computerized device over any type of network and/or network addressable connection (e.g., using a web browser).

Figure 5:
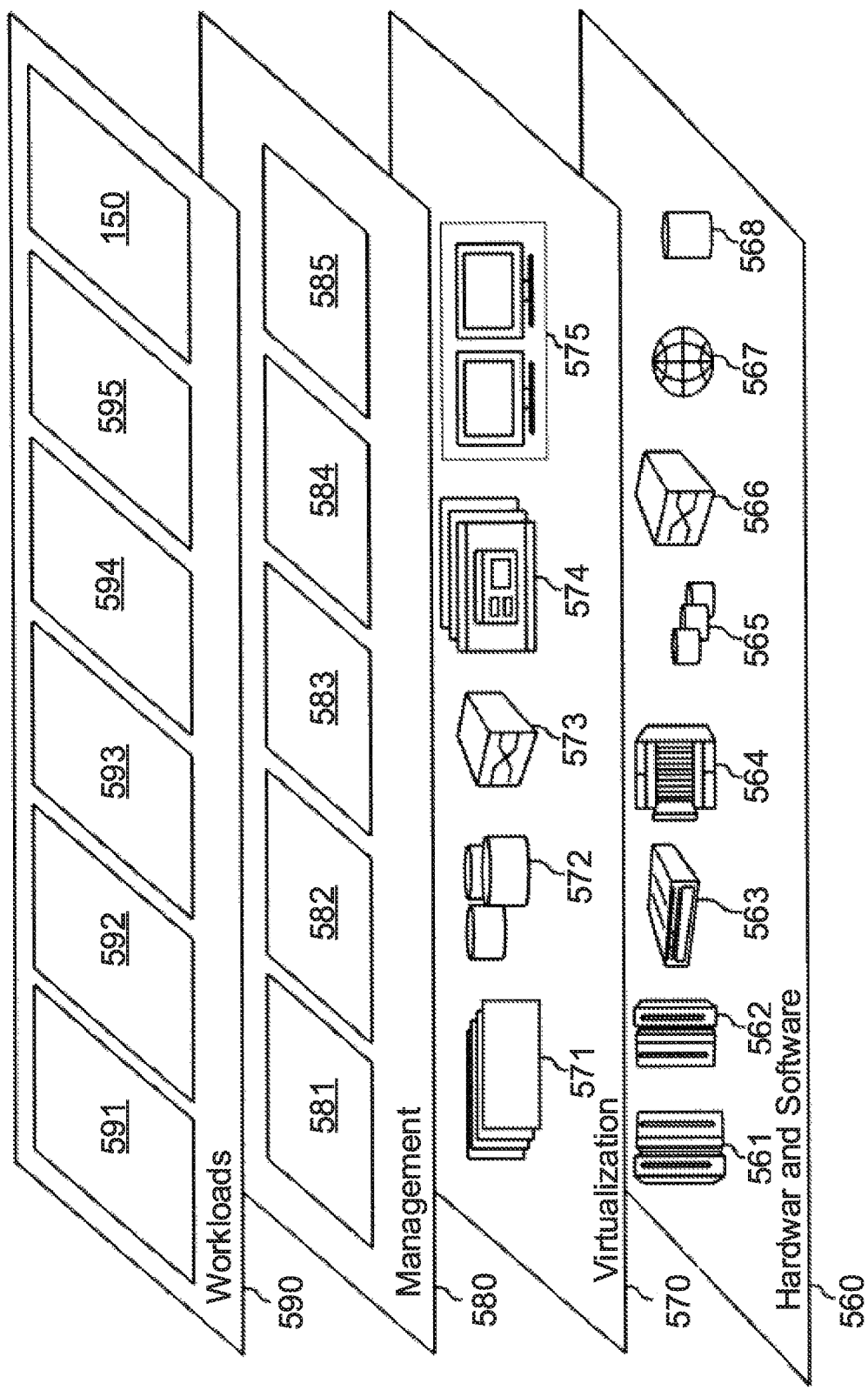
FIG. 5 is a schematic diagram of exemplary abstraction model layers, in accordance with an embodiment of the present invention.

FIG. 5 is a schematic diagram of exemplary abstraction model layers, in accordance with an embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 591; software development and lifecycle management 592; virtual classroom education delivery 593; data analytics processing 594; transaction processing 595; and the optimization system 110.

Referring to FIG. 6, methods for optimization with domain knowledge requirements are illustratively shown and described. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In block 610, domain knowledge requirements for a target system are received. In block 620, a status of the domain knowledge requirements is defined employing a factor responsive to the domain knowledge. In block 630, effective performance metrics are computed responsive to the status of the domain knowledge requirements and real performance metrics. In block 632, the real performance metrics are received from the target system. In block 634, the real performance metrics are generated in the target system responsive to tunable parameters. In block 636, built-in domain knowledge requirements are utilized in addition to the status of the domain knowledge requirements and real performance metrics. In block 640, a target system configuration is generated responsive to the effective performance metrics and the real performance metrics. In block 642, a command for the effective metric generator to send the effective performance metric to the optimization engine is received. In block 650, the target system is improved by changing a state of a function in the target system responsive to the target system configuration.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for optimization with domain knowledge requirements (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method comprising:
   connecting an optimization system to a target system via a network;
   optimizing the target system with domain knowledge requirements to model a correlation between tunable parameters and sample performance metrics to predict which of the tunable parameters can get the best sample performance metrics;
   defining, by a domain knowledge manager, a status of the domain knowledge requirements by assigning a domain knowledge requirements violation factor numerical score to each of the domain knowledge requirements;
   computing, by a metric generator, sample performance metrics of the target system responsive to the status of the domain knowledge requirements and real performance metrics from the target system;
   generating, by an optimization engine, a target system configuration responsive to the sample performance metrics and the real performance metrics; and
   adjusting the real performance metrics with a positive factor if a status of any of the domain knowledge requirements is improving and adjusting the real performance metrics with a negative factor if a status of any of the domain knowledge requirements is diminishing.

2. The computer-implemented method as recited in claim 1, wherein the domain knowledge requirements include assertion requirements and trend requirements.

3. The computer-implemented method as recited in claim 1, wherein computing includes receiving the real performance metrics from the target system.

4. The computer-implemented method as recited in claim 1, wherein generating includes receiving a command for the metric generator to send the sample performance metrics to the optimization engine.

5. The computer-implemented method as recited in claim 4, wherein receiving includes sending the command by a controller.

6. The computer-implemented method as recited in claim 1, further comprising sending tunable parameters for performance monitoring to the target system.

7. The computer-implemented method as recited in claim 1, wherein computing includes generating the real performance metrics in the target system responsive to tunable parameters.

8. The computer-implemented method as recited in claim 1, further comprising monitoring worker performance after deploying tunable parameters.

9. The computer-implemented method as recited in claim 1, wherein computing includes utilizing built-in domain knowledge in addition to the status of the domain knowledge and real performance metrics.

10. The computer-implemented method as recited in claim 1, further receiving tunable parameters and performance metrics from a configurator.

11. A computer program product comprising a non-transitory computer readable storage medium having program instructions embodied therewith, the program instructions executable by a computer to cause the computer to perform a method comprising:
    connecting an optimization system to a target system via a network;
    optimizing the target system with domain knowledge requirements to model a correlation between tunable parameters and sample performance metrics to predict which of the tunable parameters can get the best sample performance metrics;
    defining, by a domain knowledge manager, a status of the domain knowledge requirements by assigning a domain knowledge requirements violation factor numerical score to each of the domain knowledge requirements;
    computing, by a metric generator, sample performance metrics of the target system responsive to the status of the domain knowledge requirements and real performance metrics;
    generating, by an optimization engine, a target system configuration responsive to the sample performance metrics and the real performance metrics; and
    adjusting the real performance metrics with a positive factor if a status of any of the domain knowledge requirements is improving and adjusting the real performance metrics with a negative factor if a status of any of the domain knowledge requirements is diminishing.

12. A system comprising:
    a processing system including a processor device and memory receiving the domain knowledge, the processing system programmed to:
    connect an optimization system to a target system via a network;
    optimize the target system with domain knowledge requirements to model a correlation between tunable parameters and sample performance metrics to predict which of the tunable parameters can get the best sample performance metrics;
    define, by a domain knowledge manager, a status of the domain knowledge requirements by assigning a domain knowledge requirements violation factor numerical score to each of the domain knowledge requirements;
    compute, by a metric generator, sample performance metrics of the target system responsive to the status of the domain knowledge and real performance metrics;
    generate, by an optimization engine, a target system configuration responsive to the sample performance metrics and the real performance metrics; and
    adjust the real performance metrics with a positive factor if a status of any of the domain knowledge requirements is improving and adjusting the real performance metrics with a negative factor if a status of any of the domain knowledge requirements is diminishing.

13. The system as recited in claim 12, wherein the domain knowledge requirements include assertion requirements and trend requirements.

14. The system as recited in claim 12, further programmed to receive the real performance metrics from the target system.

15. The system as recited in claim 12, further programmed to receive a command for the metric generator to send the sample performance metrics to the optimization engine.

16. The system as recited in claim 15, further programmed to send the command by a controller.

17. The system as recited in claim 12, further programmed to send tunable parameters for performance monitoring to the target system.

18. The system as recited in claim 12, further programmed to generate the real performance metrics in the target system responsive to tunable parameters.

19. The system as recited in claim 12, further programmed to monitor worker performance after deploying tunable parameters.

20. The system as recited in claim 12, further programmed to utilize built-in domain knowledge in addition to the status of the domain knowledge and real performance metrics.

* * * * *